(12) United States Patent
Kane

(10) Patent No.: US 11,791,989 B2
(45) Date of Patent: Oct. 17, 2023

(54) DEPLOYING, SECURING, AND ACCESSING ENCRYPTION KEYS

(71) Applicant: KNWN Technologies, Inc., Boca Raton, FL (US)

(72) Inventor: Richard L. Kane, Wellington, FL (US)

(73) Assignee: KNWN Technologies, Inc., Boca Raton, FL (US)

(*) Notice: Subject to any disclaimer, the term of this patent is extended or adjusted under 35 U.S.C. 154(b) by 119 days.

(21) Appl. No.: 17/549,739

(22) Filed: Dec. 13, 2021

(65) Prior Publication Data

US 2022/0191011 A1 Jun. 16, 2022

Related U.S. Application Data

(60) Provisional application No. 63/124,244, filed on Dec. 11, 2020.

(51) Int. Cl.
*H04L 29/06* (2006.01)
*G06F 21/00* (2013.01)
(Continued)

(52) U.S. Cl.
CPC ............. *H04L 9/0819* (2013.01); *H04L 9/06* (2013.01); *H04L 9/0656* (2013.01); *H04L 9/0891* (2013.01)

(58) Field of Classification Search
None
See application file for complete search history.

(56) References Cited

U.S. PATENT DOCUMENTS 6,021,203 A * 2/2000 Douceur ............... H04L 9/0656
380/278
8,050,411 B2 11/2011 Munro et al.
(Continued)

FOREIGN PATENT DOCUMENTS

KR 101181558 B1 9/2012

OTHER PUBLICATIONS

International Patent Application No. PCT/US2021/063164, International Search Report and Written Opinion dated Apr. 18, 2022, 11 pages.

*Primary Examiner* — Lisa C Lewis
(74) *Attorney, Agent, or Firm* — Han Santos, PLLC

(57) ABSTRACT

Encryption keys may be deployed to a satellite, secured, and accessed from a terrestrial source that verifies entity identifying information, generates an access key that is associated in a key pair with a one-time pad (OTP) key used to encrypt a message, transmits the access key to a satellite on which the key pair and encrypted message are stored, receives the encrypted message and the OTP key from the satellite, and decrypts the encrypted message using the OTP key. The satellite receives the OTP from an extra-terrestrial delivery vehicle, stores the OTP in memory, associates one-to-one the access keys and OTP keys as the key pairs in a key pairs table, receives a request for the encrypted message, the request including the access key paired in a key pair in the key pairs table with the OTP key that was used to encrypt the message, and retrieves, in response to receiving the access key, the OTP key and the encrypted message associated in the data storage with the OTP key paired with the access key. After retrieving the OTP key and encrypted message, the satellite transmits the OTP key and encrypted message to the terrestrial source and destroys the key pair.

20 Claims, 7 Drawing Sheets

(51) Int. Cl.
*H04L 9/08* (2006.01)
*H04L 9/06* (2006.01)

(56) References Cited

U.S. PATENT DOCUMENTS

| | | | | |
|---|---|---|---|---|
| 9,001,642 | B2* | 4/2015 | Blanchard | H04B 7/1851 |
| | | | | 370/216 |
| 9,794,059 | B2* | 10/2017 | Nguyen | H04L 9/0872 |
| 11,088,838 | B2* | 8/2021 | Patel | H04L 9/0872 |
| 2014/0201518 | A1* | 7/2014 | Yao | H04L 63/062 |
| | | | | 713/155 |
| 2014/0201538 | A1* | 7/2014 | O'Hare | G06F 21/602 |
| | | | | 713/189 |
| 2015/0229621 | A1* | 8/2015 | Kariman | H04L 9/088 |
| | | | | 713/168 |
| 2015/0295907 | A1* | 10/2015 | Abrahamson | H04L 9/0656 |
| | | | | 380/46 |
| 2016/0065719 | A1* | 3/2016 | Jeong | H04W 12/06 |
| | | | | 455/420 |

* cited by examiner

US 11,791,989 B2

DEPLOYING, SECURING, AND ACCESSING ENCRYPTION KEYS

CROSS-REFERENCE TO RELATED PATENT APPLICATION

This application claims priority of U.S. Provisional Patent Application No. 63/124,244, filed on Dec. 11, 2020, entitled "NOVEL METHOD OF DEPLOYING, SECURING AND ACCESSING ENCRYPTION KEYS", which is hereby incorporated by reference in its entirety.

BACKGROUND

One billion people do not have an official proof of identity, and for those that do the identity is normally not portable across country boundaries or without physical documents. Many more people are unable to establish an electronic trust relationship, severely limiting their access to services, education, privacy. Further, those that have official identities have had them stolen.

SUMMARY

A need exists for novel approaches to establish identity and properly secure that identity while serving that identity when and where needed.

A need also exists for improved secure key distribution, enabling a higher level of security. To this end, keys may be distributed alongside bandwidth, served from an orbiting constellation of satellites.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
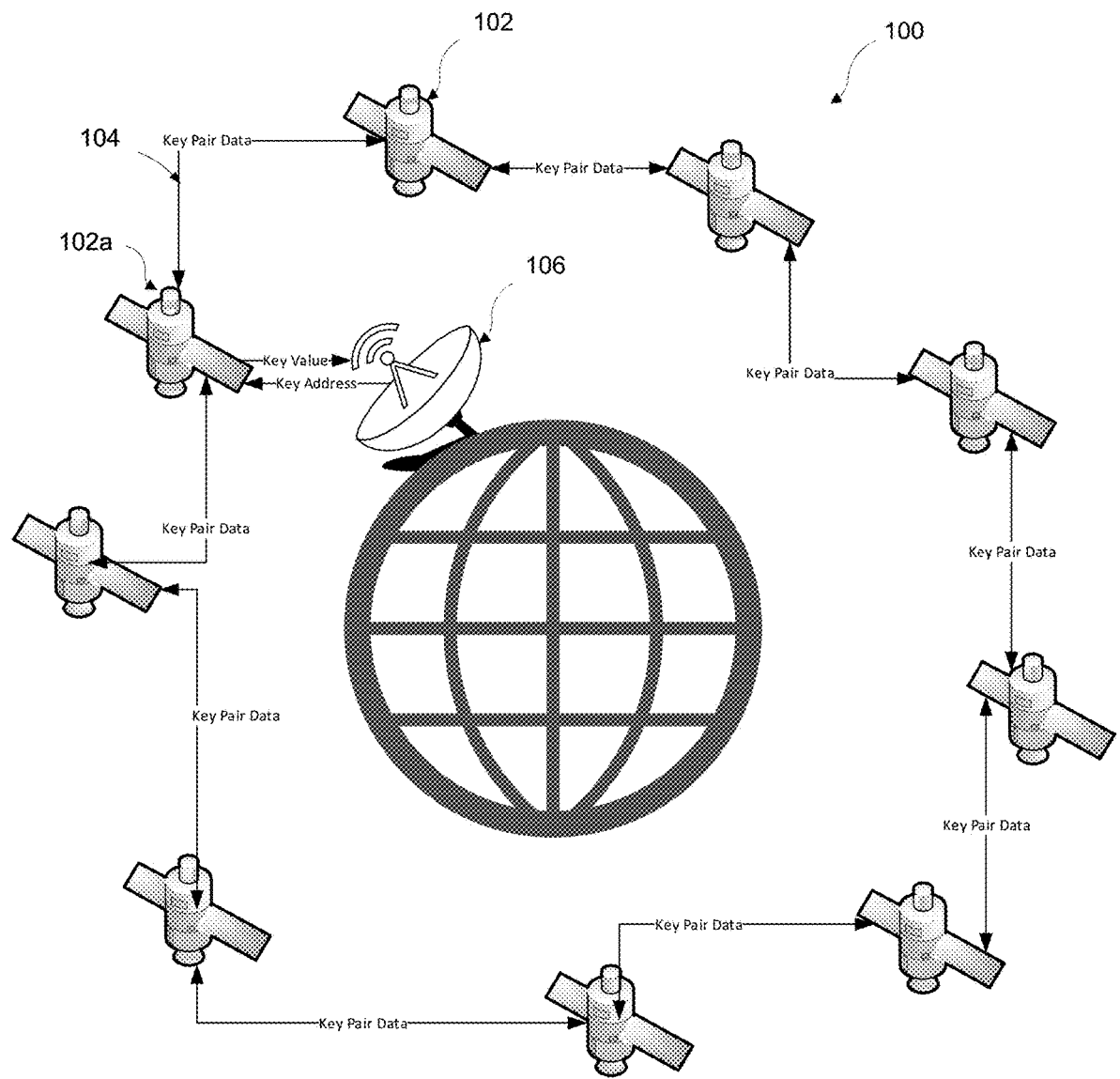
FIG. 1 depicts a constellation of satellites, disposed to communicate with each other by a channel that is not easily compromised, and a terrestrial device that communicates with one or more of the satellites.

A one-time pad (OTP), or cipher pad, is an encryption technique that uses a literal or figurative (e.g., digital) pad of random, one-time keys, each of which is the same size as, or longer than, the message that it encrypts. Using an OTP, each bit or character of the message (often plaintext—although a "message" may also be non-text information such as audio or video—transmitted in packets or streams, for example, over a variety of protocols), or part of a message, is encrypted by combining it with the corresponding bit or character from the key using a transformation such as modular addition or the like. Assuming that the key is truly random, at least as long as the plaintext, never reused in whole or in part, and kept completely secret, then the resulting ciphertext will be impossible to decrypt or break. Every shared-private-key encryption scheme has to address the challenge of secure key distribution.

Unauthorized access to encryption keys can be thwarted by physically placing them outside the reach of nations, bad actors, earthbound individuals, etc. An example is putting the keys on low earth orbiting (LEO) satellites, enhancing their utility by making them available from any point on the surface of the earth. Then, keys, and the data they protect, can be accessed from earth using appropriately configured receivers and optionally backing up the keys across multiple sub-orbital nodes (e.g., satellites), for example.

A random number generator is typically employed to generate a random number as an encryption key or encryption sequence. The random number may be generated through an algorithm, but the combination of the algorithm and starting conditions, if known, can determine the output. Therefore, security of these keys may utilize sources of random noise to generate the encryption sequences. A truly random number would ideally be generated from a truly random process. In some embodiments, true random numbers can be obtained by measuring a random physical process, such as cosmic radiation or thermal noise. An example is the arrival times of cosmic-ray background radiation or the radioactive decay of an element. In particular, the time stamp of a radioactive decay trigger can be converted into binary "1" or "0". The trigger may be the detection of a radioactive particle by a Geiger counter, for example. When a particle is detected, a positive pulse is sent to a random number generator.

In some embodiments, access to an OTP may be granted only by a single-use access key. Taken together, each key in the OTP and its single-use access key form a key pair. The access key may be fetched and transmitted by an approved entity. The entity may be identified in part by a biometric signature, DNA, IoT owned and adjacent devices, and/or pin codes, to name an exemplary few. A sufficient delay between unsuccessful access attempts combined with a long key inhibit brute force attacks on this platform.

These key pairs are stored in orbiting satellites and optionally backed up across multiple satellites or communicated between satellites, and ultimately served to ground stations when needed. A constellation of satellites may house and serve OTP encryption key pairs constituted by access keys paired one-to-one with OTP keys, providing redundancy among multiple satellites. The OTP portion of the key pairs are not generally transmitted to the satellites; they will instead be launched on secured launch platforms or generated at the satellites themselves. The OTP need only be transmitted, if at all, on a single retrieve by its access key.

The security of OTPs relies heavily on their not being obtainable by either physical confiscation or brute force attacks Maintaining the OTPs physically away from those locations can greatly enhance their security—the ability to confiscate a satellite or to mount a brute force attack against that satellite by repeated requests is severely limited.

FIG. 1 depicts a constellation 100 of satellites 102, disposed to communicate with each other by a channel 104 that is not easily compromised, and a terrestrial device 106 that communicates with one or more of the satellites 102.

In some embodiments, the satellites 102 may function independently, or some or all of them may constitute, among other things, a disaggregated storage for data or information such as, without limitation, messages, identification information, one-time pads (OTPs), access keys, and/or key pairs that comprise pairs of unique access keys and unique OTP keys (collectively, described interchangeably in this description as "messages", "data," or "information"). In addition, the satellites 102 may provide backup or redundant support for key pairs that have been brought up to a "primary" satellite 102a in the constellation 100. Backup may be performed by direct communications among the satellites 102 as shown, including without limitation by master-replica replication. The satellites 102 may communicate with each other by laser or other direct communication channel 104 that does not permit easy interception of communications.

The "terrestrial device" 106 may in a sense be termed a "terrestrial source", inasmuch as it need not necessarily be a single device. Indeed, in some embodiments, one or more of the components, both hardware and software, as well as functions performed thereby, may be distributed among multiple devices in different locations. However, the terrestrial "source" will be termed a terrestrial "device" herein, without loss of clarity or scope.

In some embodiments, the terrestrial device 106 may include a computing device configured to perform a variety of operations, including without limitation one or more of receiving and/or generating OTPs, verifying an entity in accordance with information that identifies the entity, transmitting access keys to one or more of the satellites 102, receiving encrypted information, and decrypting the information.

Figure 2:
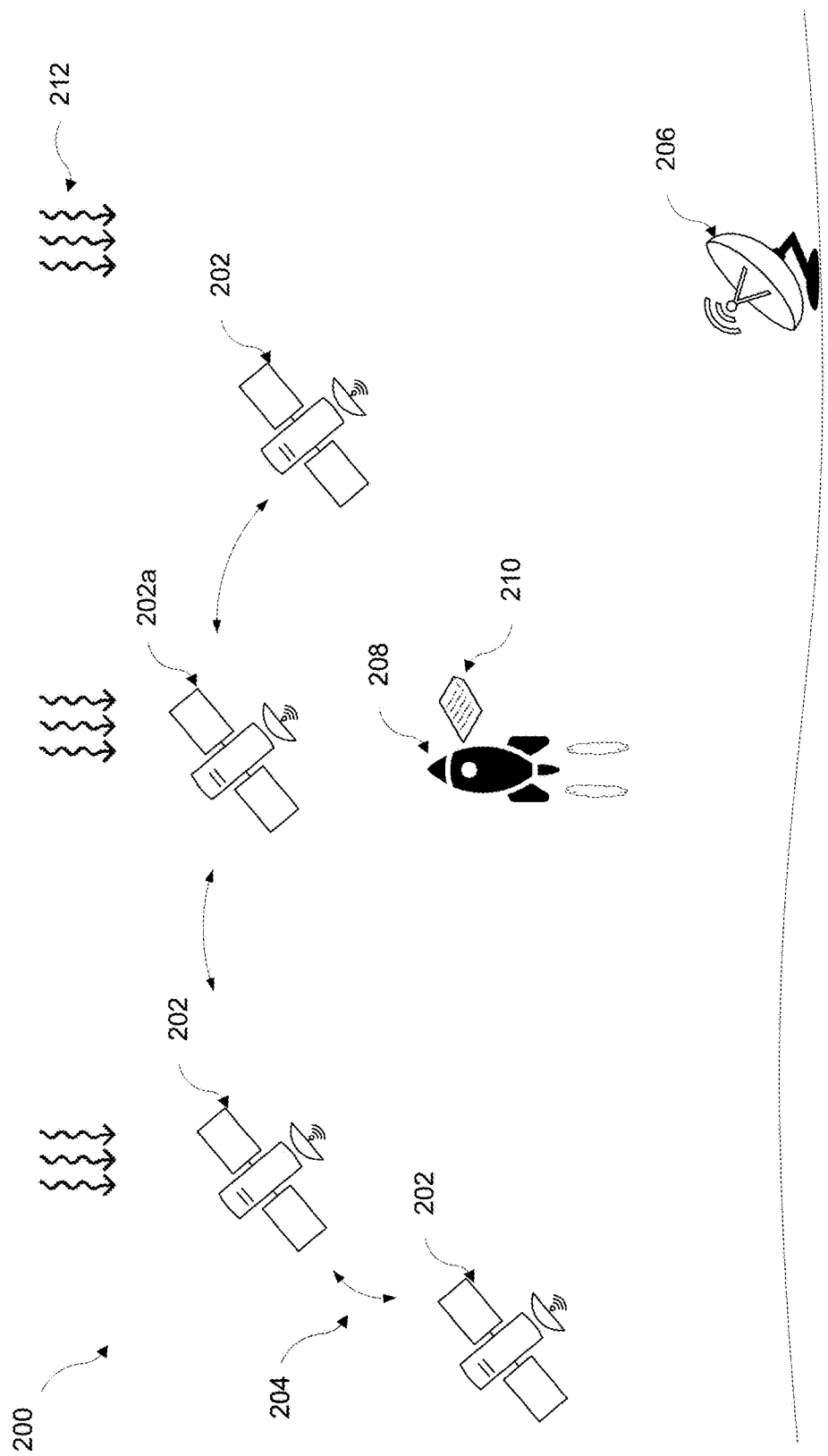
FIG. 2 depicts an example configuration of a system for deploying, securing, and accessing encryption keys.

FIG. 2 depicts an example configuration of a system 200 for deploying, securing, and accessing encryption keys. In some embodiments, the system 200 may include one or more satellites 202 that correspond to the satellites 102 of FIG. 1 (only four satellites are shown for clarity, including a primary satellite 202a) and communicate over a communication channel 204 that may correspond to the communication channel 104, and a terrestrial device 206 that may correspond to the terrestrial device 106 of FIG. 1. A delivery vehicle 208, for example a rocket, that is capable of delivering a payload 210 to the primary satellite 202a is shown on its way to the primary satellite 202a. Background (e.g., cosmic) radiation 210 is generally present, even at low earth orbit.

As in the case of the satellites 102, the satellites 202 may function independently, or some or all of them may constitute, among other things, a disaggregated storage as described above. In addition, the satellites 202 may provide backup support for key pairs. For example, the payload 210 may include an OTP 210 containing multiple OTP keys, which may then be paired with access keys and transmitted in whole or in part to one or more of the other satellites 202. Backup may be performed by direct communications among the satellites 202 over the communication channel 204 as shown.

The delivery vehicle 208 may be a rocket as shown, but other vehicles that are capable of delivering OTPs to one or more of the satellites 202 would be suitable as well. The payload 210 itself may be delivered by the delivery vehicle 208 via laser or other wireless connection, or via a physical connection using secure technology as understood by one of ordinary skill.

Figure 3:
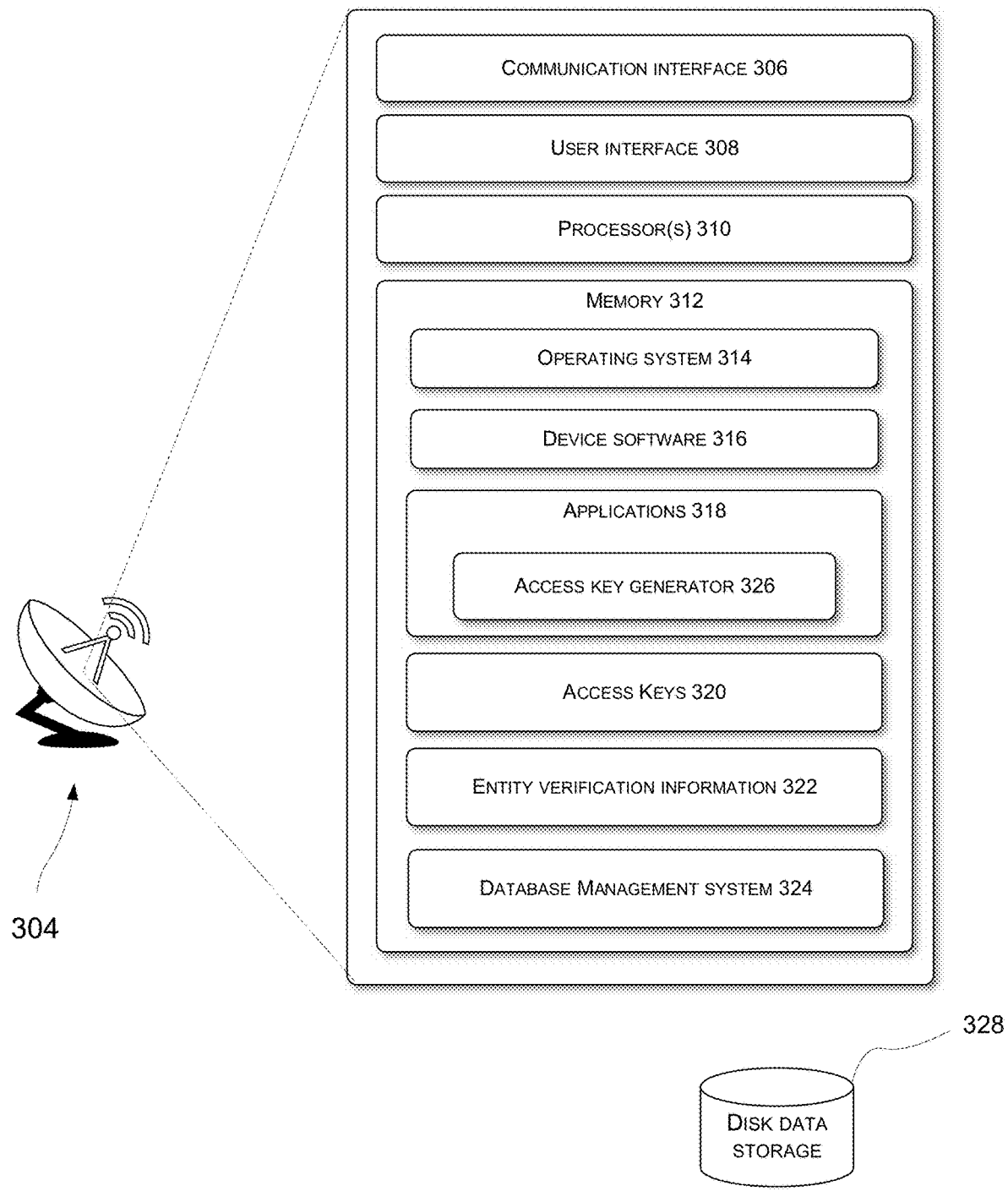
FIG. 3 depicts a terrestrial device for verifying entity identifying information, sending access keys to a satellite such as the primary satellite, and decrypting encrypted information using an OTP key.

FIG. 3 depicts a terrestrial device 304 for verifying entity identifying information, sending access keys to a satellite such as the primary satellite 202a, and decrypting encrypted information using an OTP key. The terrestrial device 304 may correspond to the terrestrial device 104 or the terrestrial device 204 illustrated in FIG. 1 and FIG. 2, respectively. In the description following next, reference will be made to components illustrated in FIG. 2. One of ordinary skill in the art will recognize that the description pertains similarly to FIG. 1.

In at least one embodiment, the terrestrial device 304 may include a communication interface 306, a user interface 308, one or more processors 310, and memory 312. The communication interface 306 may include communication components that enable the terrestrial device 304 to transmit or receive data communication to or from one or more of the satellites 202. The user interface 308 may enable a user to provide input and receive output from the terrestrial device 304.

The user interface 308 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 312 may be implemented using computer-readable media, such as computer storage media. Computer-readable media includes, at least, two types of computer-readable media, namely computer storage media and communications media. Computer-readable storage media can include or encompass volatile and non-volatile, removable and non-removable media implemented in any method or technology for storage of information such as computer-readable instructions, data structures, program modules, or other data. Computer-readable storage media includes, but is not limited to, random access memory (RAM), read only memory (ROM), electrically erasable programmable read only memory (EEPROM), flash memory or other memory technology, compact disk-read only memory (CD-ROM), digital versatile disks (DVD), high-definition multimedia/data storage disks, or other optical storage, magnetic cassettes, magnetic tape, magnetic disk storage or other magnetic storage devices, or any other medium that can be used to store information for access by a computing device. As defined herein, computer-readable storage media do not consist of, and are not formed exclusively by, modulated data signals, such as a carrier wave. In contrast, communication media may embody computer-readable instructions, data structures, program modules, or other data in a modulated data signal, such as a carrier wave, or other transmission mechanism.

The one or more processors 310 and the memory 312 may implement an operating system 314, device software 316, and/or one or more applications 318. The various software and applications may include routines, program instructions, objects, and/or data structures that perform particular tasks or implement particular abstract data types. The operating system 314 may include components that enable the terrestrial device 304 to receive and transmit data via various interfaces (e.g., user controls, communication interface 306, and/or memory input/output devices). The operating system 314 may also process data using the one or more processors 310 to generate outputs based on inputs that are received via the user interface 308. For example, the operating system 314 may provide an execution environment for the execution of the applications 318. The operating system 314 may include a presentation component that presents the output (e.g., display the data on an electronic display, store the data in memory, transmit the data to another electronic device, etc.).

The operating system 314 may further include an interface layer that enables applications to interface with the communication interface 306. The interface layer may comprise public APIs, private APIs, or a combination of both public APIs and private APIs. Additionally, the operating system 314 may include other components that perform various other functions generally associated with an operating system. The device software 316 may include software components that enable the user device to perform functions. For example, the device software 316 may include a basic input/output system (BIOS), Boot ROM, or a bootloader that boots up the terrestrial device 304 and executes the operating system 314 following power up of the device.

The applications 318 may include an access key generator 326. The access key generator 326 may generate access keys from a random number generator. In some embodiments, the random number generator generates random numbers from cosmic background radiation as described elsewhere herein. Other techniques may be used to generate the random numbers. The longer the random number, the more difficult it will be to discover the number without stealing the it. In some embodiments, the random number is as long as the OTP with which it is to be associated. Additional applications may provide utility and/or productivity functionalities to a user of the terrestrial device 304. For example, the applications 318 may further include electronic mail applications, remote desktop applications, web browser applications, navigation applications, office productivity applications, streaming applications, and/or so forth.

Memory 312 may further store the access keys 320 and/or entity verification information 322. In some embodiments, the access keys 320 may be associated one-to-one with keys of the OTP pad 210 and stored with that association on one or more of the satellites 202. The entity verification information may be used to identify the entity seeking the encrypted message stored on the satellite (e.g., the primary satellite 202a). In the case of a human entity, the verification information may be, without limitation, biometric information (e.g., one or more fingerprints, a retinal scan, an electronic signature, and/or the like), DNA, a knowledge or behavior test, a token, etc. A non-human entity such as an IoT or other device may be verified by a certificate or token. Other verification information and verifying techniques are also considered within the spirit and scope of this disclosure.

The one or more processors 310 and the memory 312 may further implement a database management system 324 to manage a disk data storage 328 in the terrestrial source 304 or externally. The disk storage 328 may store access keys, verification information, random numbers, and/or other information that may be used in operations performed by the terrestrial device 304.

Figure 4:
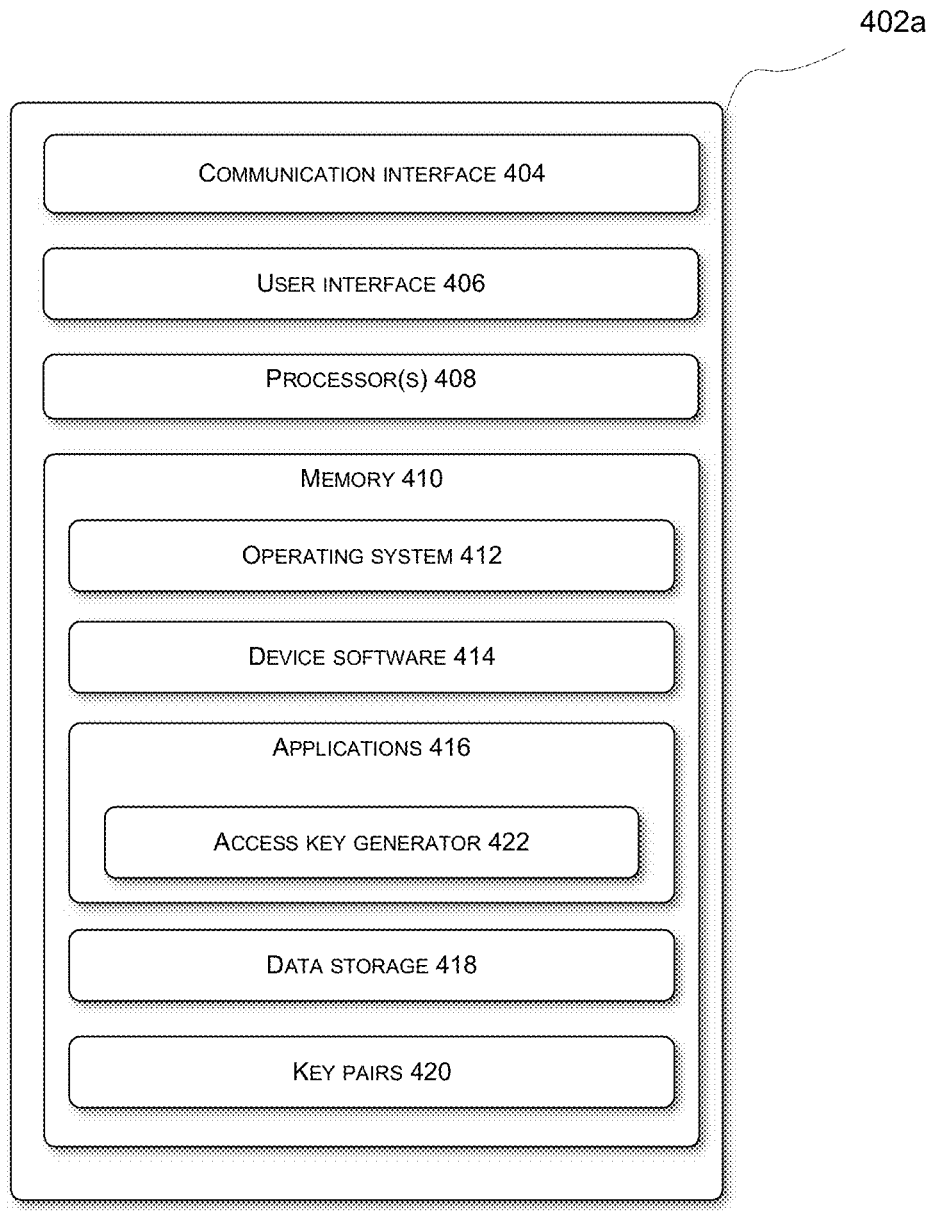
FIG. 4 depicts a satellite for storing OTPs and messages encrypted using an OTP key.

FIG. 4 depicts a primary satellite 402a (in a constellation of satellites 402) for storing OTPs 210 and messages encrypted using an OTP key. The satellite 402a may correspond to the primary satellite 102a or the primary satellite 202a illustrated in FIG. 1 and FIG. 2, respectively.

In at least one embodiment, the satellite 402a may include a communication interface 404, a user interface 406, one or more processors 408, and memory 410. The communication interface 404 may include communication components that enable the satellite 402 to transmit or receive data communication to or from the terrestrial device 304 and/or one or more of the satellites 402.

The memory 410 may be implemented using computer-readable media, such as computer storage media. Computer-readable media includes, at least, two types of computer-readable media, namely computer storage media and communications media. Computer-readable storage media can include or encompass volatile and non-volatile, removable and non-removable media implemented in any method or technology for storage of information such as computer-readable instructions, data structures, program modules, or other data. Computer-readable storage media includes, but is not limited to, random access memory (RAM), read only memory (ROM), electrically erasable programmable read only memory (EEPROM), flash memory or other memory technology, compact disk-read only memory (CD-ROM), digital versatile disks (DVD), high-definition multimedia/data storage disks, or other optical storage, magnetic cassettes, magnetic tape, magnetic disk storage or other magnetic storage devices, or any other medium that can be used to store information for access by a computing device. As defined herein, computer-readable storage media do not consist of, and are not formed exclusively by, modulated data signals, such as a carrier wave. In contrast, communication media may embody computer-readable instructions, data structures, program modules, or other data in a modulated data signal, such as a carrier wave, or other transmission mechanism.

The one or more processors 408 and the memory 410 may implement an operating system 412, device software 414, one or more applications 416, a data storage 418 and key pairs 420. The various software and applications may include routines, program instructions, objects, and/or data structures that perform particular tasks or implement particular abstract data types. The operating system 412 may include components that enable the primary satellite 402a to receive and transmit data via various interfaces (e.g., the communication interface 404, the user interface 406, and/or memory input/output devices). The operating system 412 may also process data using the one or more processors 408 to generate outputs based on inputs. For example, the operating system 412 may provide an execution environment for the execution of the applications 416. The operating system 412 may include a presentation component that presents the output (e.g., display the data on an electronic display, store the data in memory, transmit the data to another electronic device, etc.).

The operating system 412 may further include an interface layer that enables applications to interface with the communication interface 404. The interface layer may comprise public APIs, private APIs, or a combination of both public APIs and private APIs. Additionally, the operating system 412 may include other components that perform various other functions generally associated with an operating system. The device software 414 may include software components that enable the user device to perform functions. For example, the device software 414 may include a basic input/output system (BIOS), Boot ROM, or a bootloader that boots up the satellite 402a and executes the operating system 412 following power up of the device.

The applications 416 may include an access key generator 422. In some embodiments, the primary satellite 402a may not receive the access keys from the terrestrial device 304, but may instead generate the access keys 424. The access keys may be random numbers generated using cosmic background radiation as described elsewhere herein. The applications 416 may further include applications that provide utility and/or productivity functionalities to a user of the satellite 402a. For example, the applications 416 may further include electronic mail applications, remote desktop applications, web browser applications, navigation applications, office productivity applications, streaming applications, and/or so forth.

The data storage 418 may store, among other things, data or information such as, without limitation, messages, identification information, and/or other information desired to be kept off Earth and away from ready access to unauthorized entities. In some instances, the stored information is encrypted, for example using an OTP key. The data storage 418 may contain tables or the like associating the encrypted messages with the OTP keys used to encrypt them, respectively.

The memory 410 may further store key pairs. In some embodiments, the key pairs comprise one access key and one OTP key. In some instances, the access key and the OTP key in a key pair are long random numbers, each at least as long as the message that is encrypted with the OTP key.

Figure 5:
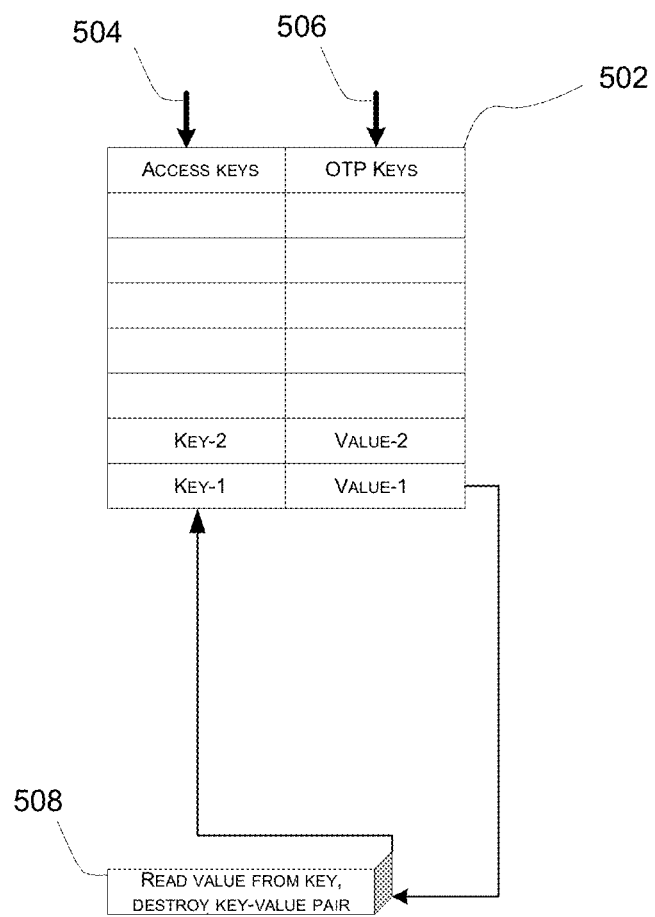
FIG. 5 illustrates a key-value table in which one-time access keys are paired with the keys of a one-time pad (OTP).
Figure 6:
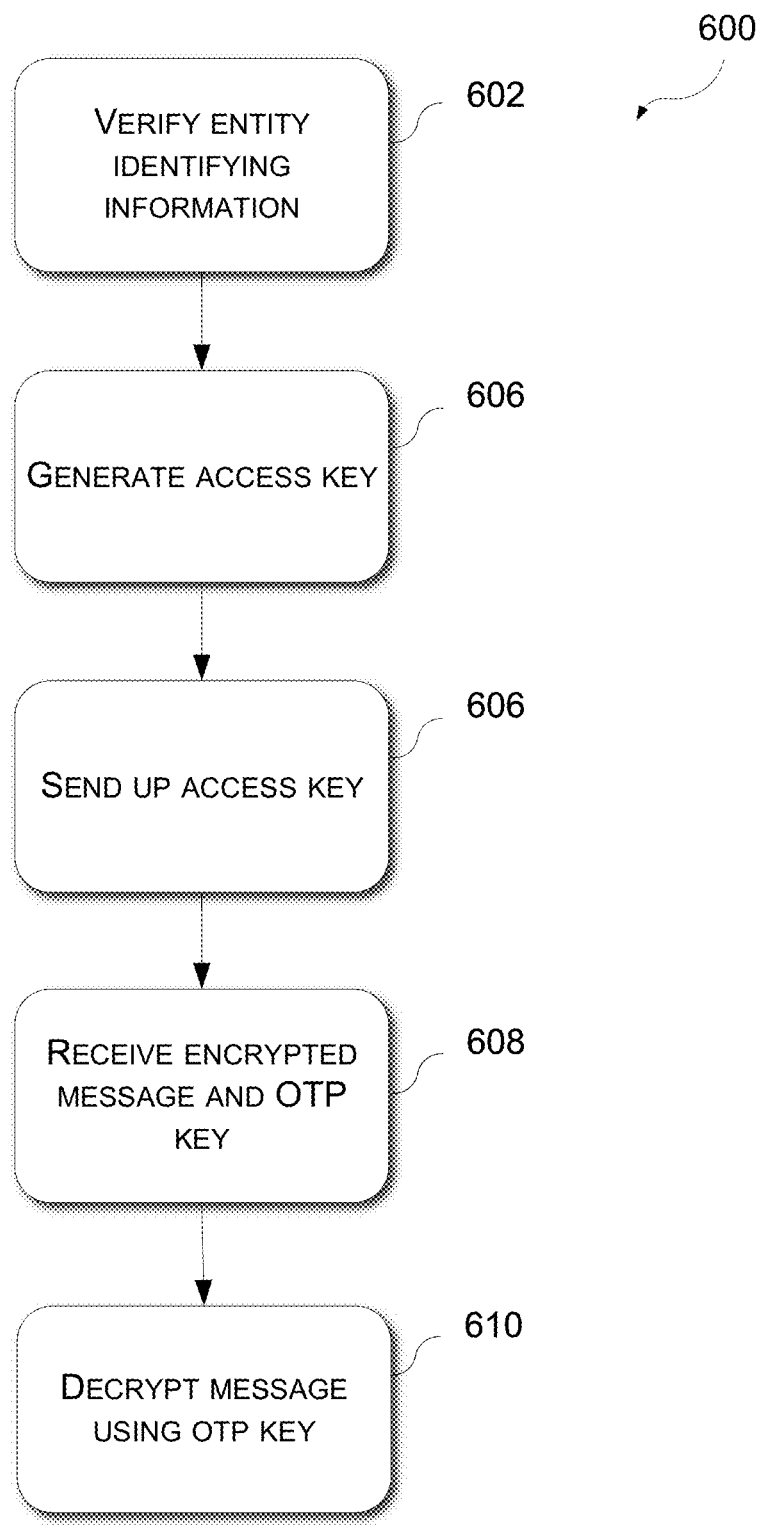
FIG. 6 depicts a process that may be performed, at least in part, at the terrestrial device.
Figure 7:
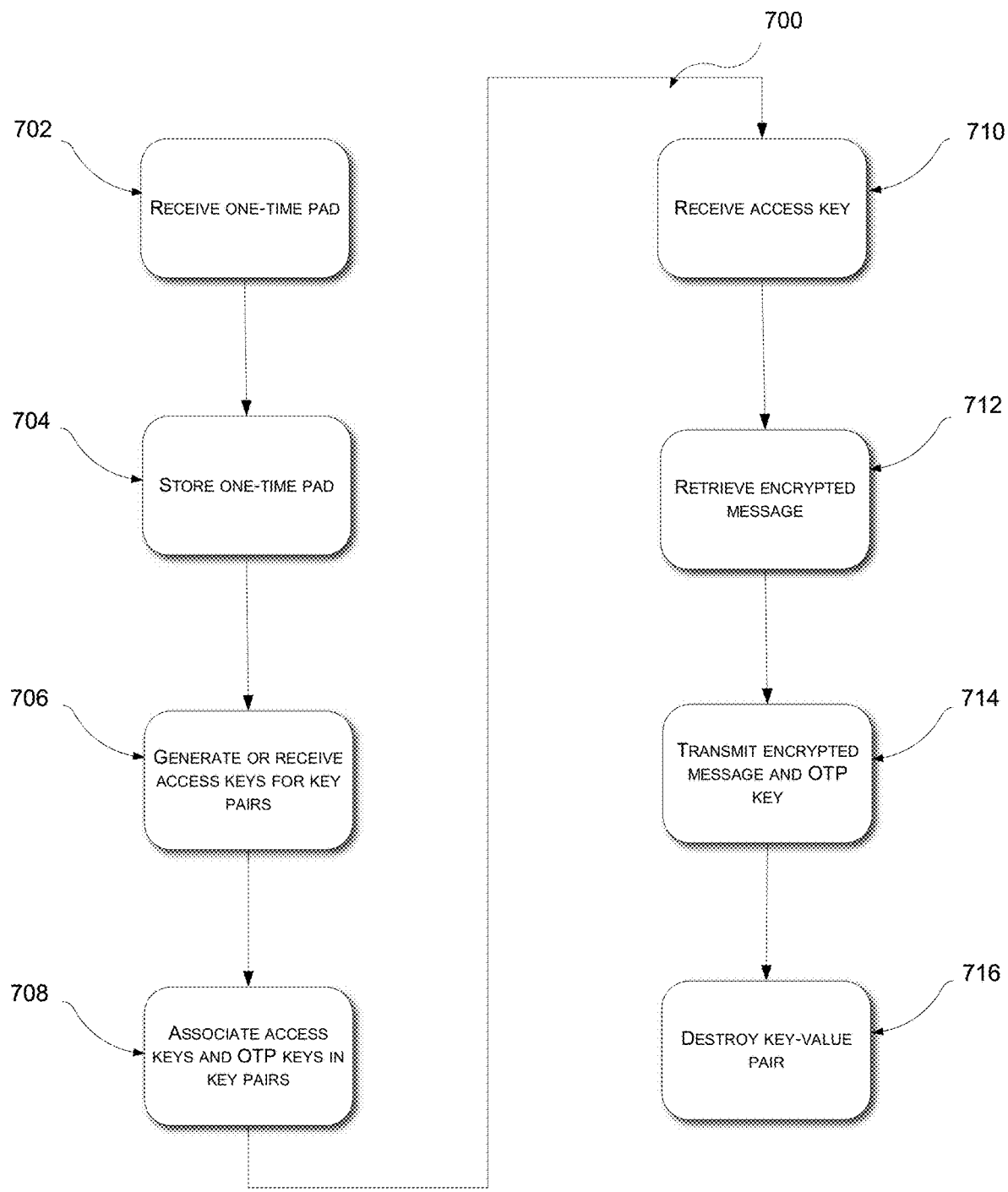
FIG. 7 depicts a process that may be performed, at least in part, at the primary satellite.

FIGS. 5-7 present illustrative processes for deploying, securing, and accessing encryption keys. The processes are illustrated respectively as a collection of blocks in logical flow charts, which represent sequences of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process FIG. 5 illustrates a key-value table 502 in which one-time access keys 504 are paired with the keys of an OTP 506 (values). Collectively, the OTP keys constitute an OTP. The key-value table 502 may be stored in the memory 410. Input of a unique very long access key 502 returns a randomized OTP encryption value (key) 504. For example, in some embodiments, the access key Key-1 returns Value-1 (OTP Key-1), access key Key-2 returns Value-2 (OTP Key-2), etc. After each use, the key pair just accessed is destroyed (e.g., deleted) as at 508 to avoid reuse of the OTP key, which can compromise security by increasing the possibility of a successful brute-force attack, for example.

FIG. 6 depicts a process 600 that may be performed, at least in part, at the terrestrial device 304. Although operations shown in FIG. 6 are described as being performed at least in part by the terrestrial device 304, all operations need not be performed by the same device or at the same physical location. In addition, where the primary satellite 402a is involved, it is also contemplated that one or more of the other satellites in the constellation 100 may be substituted or included as the case permits.

At block 602, the terrestrial device 304 may verify entity identifying information. The identified entity may be a human or a non-human. Examples of human identifying information may include, but are not limited to, biometric information (e.g., one or more fingerprints, a retinal scan, an electronic signature, and/or the like), DNA, a knowledge or behavior test, a token, etc. A non-human entity such as an IoT or other device may be verified by a certificate or token. One purpose for using entity verification information may be authorization to obtain an access key by which to obtain encrypted information using the OTP.

At block 604, the access key generator 422 may generate one or more access keys. For example, the access key generator may generate a random number as an access key, using cosmic background radiation detected at the primary satellite 402a and transmitted down to the terrestrial device 304 or detected at the Earth's surface by the terrestrial device 304 or another device and supplied to the terrestrial device 304. Other random number generators or sources of random numbers may be employed, understanding that true random numbers are the most secure keys. The access key may be generated in response to a positive verification of the entity. In other embodiments, one or more access keys may have been generated in advance, with one supplied in response to a positive verification.

At block 606, the terrestrial device 304 may transmit the access key to the primary satellite 402a, for example as part of or associated with a request for an encrypted message. In some embodiments, access keys may be generated and transmitted to the primary satellite for pairing with the OTP keys. In other embodiments, the access keys may be generated at the satellite and stored in key pairs with the OTP keys. In both instances, the access key sent up at block 606 may be matched to the access key in an existing key pair and thereby used to retrieve an OTP key that was used to encrypt a message sought by the verified entity. In this way, the access keys and OTP keys are placed outside of the reach of individual actors, even bad acting nations; unless the physical transport is intercepted, the key pairs may be delivered to the primary satellite safely, without their being compromised or stolen.

At block 608, the terrestrial device 304 may receive the encrypted message and the OTP key that was used to encrypt it. As indicated above, the OTP key was paired with the access key that was sent up at block 606, and was therefore able to be retrieved by the access key.

At block 610, the terrestrial device 304 may decrypt the encrypted message using the OTP key that was used to encrypt the message. Advantageously, with the OTP key, decryption is a very low CPU, lightning-fast task to decrypt the information. Thus, decryption can be done at the point of consumption. The decrypted message never leaves the device unless and until it is encrypted again using another OTP key (also a low CPU task).

FIG. 7 depicts a process 700 that may be performed, at least in part, at the primary satellite 402a. Although operations shown in FIG. 7 are described as being performed at least in part by the primary satellite 402a, all operations need not be performed by the same device or at the same physical location. In addition, it is also contemplated that one or more of the other satellites in the constellation 100 may be substituted or included as the case permits.

At block 702, the primary satellite 402a may receive an OTP. In some embodiments, the OTP may be delivered by the delivery vehicle 208. In other embodiments, the OTP may be generated at the primary satellite, e.g., as random numbers generated from cosmic background radiation or other true random number source.

At block 704, the primary satellite 402a may store the OTP in memory 410. In some embodiments, the OTP keys constitute the value column of the key pairs table 502 stored in key pairs 420.

At block 706, the primary satellite 402a may generate or receive access keys for the key pairs. If the access keys are generated at the primary satellite, then they are transmitted to the terrestrial device 304 for use by a verified entity to retrieve an OTP key. Such access keys are long numbers, at least as long as the OTP key with which it is paired, and may be generated from cosmic background radiation or another true random number generator source.

At block 708, the primary satellite 402a may associate the access keys and the OTP keys as key pairs in the key pairs table 502. In some embodiments, each access key is unique and each OTP key is unique, and their key pairs are thus also unique.

At block 710, the primary satellite 402a may receive an access key from the terrestrial device 304. In some embodiments, the access key is transmitted to the primary satellite in response to verification of an entity seeking to retrieve an OTP key and message encrypted by the OTP key. The access key may be transmitted by suitable Earth-to-satellite transmission technology.

At block 712, the primary satellite 402a may retrieve the encrypted message associated in the data storage 418 with the OTP key, which itself is associated in the key pairs 420 with the access key received at block 710.

At block 714, the primary satellite 402a may transmit the retrieved encrypted message and OTP key to the terrestrial device 304. In some embodiments, the encrypted message and OTP key are transmitted separately. The OTP key may also be encrypted in some fashion.

At block 716, the primary satellite 402a may destroy the key-value pair (key pair) in the key pairs table 502 stored in the key pairs 420. Destroying the key pair prevents its reuse.

Furthermore, techniques described herein enable a revenue model for this service based on the availability and scarcity of the key pairs. According to this model, data encrypted with the one-time pad can only be decrypted when the one-time pad is retrieved and utilized in the encryption. To be re-encrypted, a new one time key/pad pair must be consumed. Each OTP key (or each access key) can be purchased individually according to this model. Additionally, or in the alternative, an entire OTP may be purchased and, once depleted, will need to be repurchased.

Techniques are described herein to implement deploying, securing, and accessing encryption keys. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed at a terrestrial source, comprising:
    verifying entity identifying information;
    generating an access key that is associated in a key pair with a one-time pad (OTP) key used to encrypt a message;
    transmitting the access key to a satellite on which the key pair and encrypted message are stored;
    receiving the encrypted message and the OTP key from the satellite; and
    decrypting the encrypted message using the OTP key.

2. The method of claim 1, wherein the entity identifying information includes biometric data.

3. The method of claim 1, wherein the entity identifying information includes DNA.

4. The method of claim 1, wherein the entity identifying information includes a token.

5. The method of claim 1, wherein the access key is generated in response to a positive verification of the entity identifying information.

6. The method of claim 1, wherein the access key is a random number generated from cosmic background radiation.

7. The method of claim 6, wherein the cosmic background radiation is received from the satellite.

8. A method performed at a satellite, comprising:
    receiving a one-time pad (OTP) having OTP keys;
    storing the OTP in memory;
    associating one-to-one a plurality of access keys and OTP keys as key pairs in a key pairs table;
    receiving a request for an encrypted message, the request including an access key paired in a key pair in the key pairs table with the OTP key that was used to encrypt the message;
    retrieving, in response to receiving the access key, the OTP key and the encrypted message associated in the data storage with the OTP key paired with the access key; and
    transmitting the OTP key and the encrypted message.

9. The method of claim 8, further comprising:
    destroying the key pair in the key pairs table.

10. The method of claim 8, further comprising:
    backing up the key pairs in one or more additional satellites in a satellite constellation that includes the satellite that received the OTP.

11. The method of claim 8, wherein the OTP is received from an extra-terrestrial delivery vehicle.

12. The method of claim 8, further comprising:
    receiving the access keys for pairing with the OTP keys.

13. The method of claim 8, further comprising:
    generating the access keys for pairing with the OTP keys.

14. One or more non-transitory computer-readable media containing instructions that, if executed by a computing device, cause the computing device to perform operations comprising:
    receiving a one-time pad (OTP) having OTP keys;
    storing the OTP in memory;
    associating one-to-one a plurality of access keys and OTP keys as key pairs in a key pairs table;
    receiving a request for an encrypted message, the request including an access key paired in a key pair in the key pairs table with the OTP key that was used to encrypt the message; and
    retrieving, in response to receiving the access key, the OTP key and the encrypted message associated in the data storage with the OTP key paired with the access key.

15. The one or more non-transitory computer-readable media of claim 14, the operations further comprising:
    destroying the key pair in the key pairs table.

16. The one or more non-transitory computer-readable media of claim 14, the operations further comprising:
    backing up the key pairs in one or more additional satellites in a satellite constellation that includes the satellite that received the OTP.

17. The one or more non-transitory computer-readable media of claim 14, wherein the OTP is received from an extra-terrestrial delivery vehicle.

18. The one or more non-transitory computer-readable media of claim 14, the operations further comprising:
    receiving the access keys for pairing with the OTP keys.

19. The one or more non-transitory computer-readable media of claim 14, the operations further comprising:
    generating the access keys for pairing with the OTP keys.

20. The one or more non-transitory computer-readable media of claim 19, wherein the access keys are random numbers generated from cosmic background radiation.

\* \* \* \* \*